(12) United States Patent
Moy et al.

(10) Patent No.: US 6,286,545 B1
(45) Date of Patent: Sep. 11, 2001

(54) POWER STEERING FLUID RESERVOIR

(75) Inventors: Daniel Moy, West Bloomfield; David Kaminski, Lake Orion; John E Saarinen, Washington, all of MI (US)

(73) Assignees: DaimlerChrysler Corporation, Auburn Hills; TRW Inc, Sterling Heights, both of MI (US)

(*) Notice: Subject to any disclaimer, the term of this patent is extended or adjusted under 35 U.S.C. 154(b) by 0 days.

(21) Appl. No.: 09/496,373

(22) Filed: Feb. 2, 2000

(51) Int. Cl.[7] .................................................. F16K 21/28
(52) U.S. Cl. .................. 137/574; 137/576; 137/565.19; 137/565.37; 137/550
(58) Field of Search .................. 137/565.19, 565.37, 137/574, 576, 549, 550

(56) References Cited

U.S. PATENT DOCUMENTS

| | | | |
|---|---|---|---|
| 973,474 | * 10/1910 | Cameron | 137/550 |
| 2,719,583 | * 10/1955 | Malick | 137/576 |
| 3,312,353 | * 4/1967 | Rosaen | 137/549 |
| 3,508,657 | 4/1970 | Cooper | 210/90 |
| 3,727,761 | 4/1973 | Aspinwall | 210/130 |
| 3,879,289 | 4/1975 | Aspinwall | 210/90 |
| 3,970,557 | 7/1976 | Shoup | 210/130 |
| 4,424,829 | * 1/1984 | Millington et al. | 137/590 |
| 4,513,774 | * 4/1985 | Reid | 137/574 |
| 4,650,572 | 3/1987 | Hayes | 210/131 |
| 4,995,970 | 2/1991 | Ohsakai | 210/167 |
| 5,493,863 | 2/1996 | Yanagi et al. | 60/583 |
| 5,718,281 | 2/1998 | Bartalone | 165/41 |
| 5,820,356 | 10/1998 | Ogbuaku | 417/313 |
| 5,906,221 | 5/1999 | Mancell | 137/549 |
| 5,918,760 | 7/1999 | Frodin et al. | 220/661 |

FOREIGN PATENT DOCUMENTS

1171673 * 1/1959 (FR).

* cited by examiner

Primary Examiner—A. Michael Chambers
(74) Attorney, Agent, or Firm—Mark P. Calcaterra

(57) ABSTRACT

A reservoir for power steering fluid includes an upright housing that forms an upper interior space for storage of a reserve fluid supply, and a lower interior space containing a fluid filter. Fluid connectors are provided for causing fluid to flow in a circumferential swirling pattern as it moves through the filter, such that the flowing fluid has a relatively long residence time in the lower portion of the reservoir for achievement of an effective cooling action. The fluid filter is connected in a return line form the power steering unit to the associated pump, so that the filter exerts a back pressure on fluid flowing from the power steering unit to the filter.

7 Claims, 2 Drawing Sheets

POWER STEERING FLUID RESERVOIR

BACKGROUND AND SUMMARY OF THE INVENTION

This invention relates to a power steering fluid system for an automobile vehicle, and particularly to a fluid reservoir for a power steering fluid system. The reservoir incorporates a filtration unit that is functionally located in the fluid return line from the power steering unit to the fluid pump that supplies pressurized fluid to the power steering unit.

A typical power steering system for a motor vehicle includes a fluid pump for supplying pressurized fluid to a power steering unit that is connected to a return line that leads back to the pump. Often the fluid system includes a filter for trapping solid contaminants that can form during prolonged usage of the power steering system. The filter can be located in the pressure line between the pump and steering unit, or in the return line between the steering unit and the pump. In many non-sealed systems a reservoir is provided for supplying steering fluid to the system, and for accommodating excess fluid volumes associated with high fluid temperatures that occur in high temperature environments and/or cyclic operation of the power steering unit.

The present invention relates to a fluid reservoir for power steering fluid, wherein the reservoir, which incorporates a filter, is functionally located in the return line between the power steering unit and the fluid pump. The reservoir is designed so that the fluid flowing through the filter is in a swirling condition, whereby heated fluid is mixed with relatively cool fluid so as to achieve a reasonably even fluid temperature, without hot spots as might degrade the fluid or cause fluid foaming.

A particular aim of the invention is to provide a reservoir having a relatively small height dimension, whereby the reservoir can fit within small spaces in the vehicle engine compartment. Typically, the reservoir height dimension can be in the neighborhood of six inches.

Patents of prior art interest are U.S. Pat. No. 5,906,221 to M. Mancell, U.S Pat. No. 5,820,356 to D. Ogbuaku, U.S. Pat. No. 4,650,572 to W. Hayes, and U.S. Pat. No. 5,918,760 to S. Frodin. The fluid reservoir of the present invention is advantageous over the prior art as regards compactness, good fluid mixing cavitation prevention, and low noise production. Circumferential swirling motion of the fluid is controlled to prevent cavitation of the swirling fluid mass, as might produce undesired noise. The filter is designed to exert a back pressure in the fluid return line, so as to minimize pulsations or flow variations that might generate a perceptible shudder or vibration during operation of power steering unit.

Further features of the invention will be apparent from the attached drawings and description of an illustrative embodiment of the invention.

DESCRIPTION OF A PREFERRED EMBODIMENT OF THE INVENTION

Figure 1:
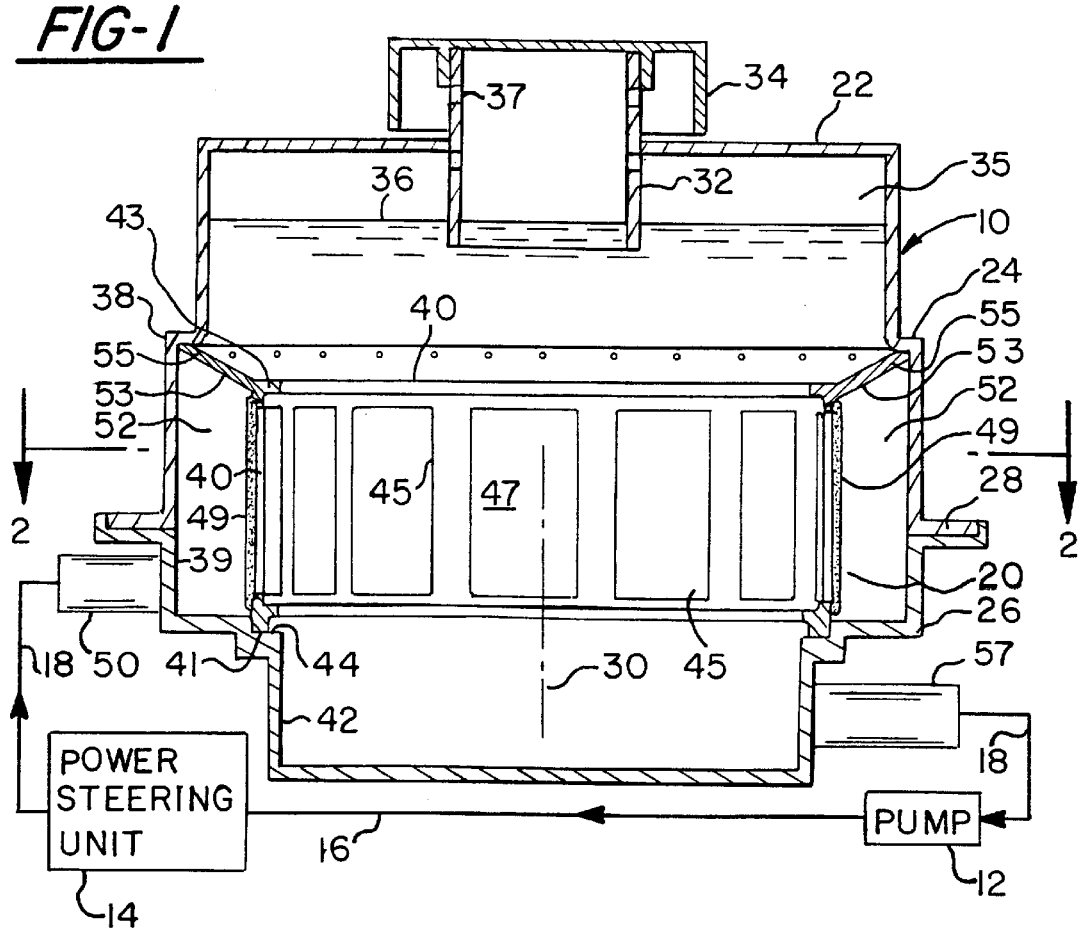
FIG. 1 is a sectional view taken through a fluid reservoir embodying the invention.
Figure 2:
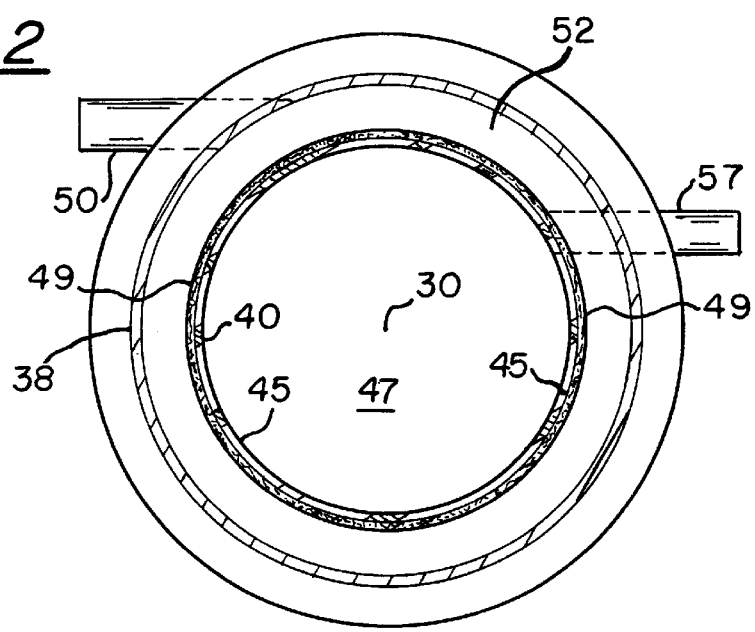
FIG. 2 is a transverse sectional view taken on line 2—2 in FIG. 1.

Referring to FIGS. 1 and 2, there is shown some features of a fluid reservoir embodying the invention. As schematically shown, fluid reservoir 10 is in circuit with a fluid pump 12 and power steering unit 14 of conventional design. The fluid circuit includes a high pressure line 16 for supplying fluid to power steering unit 14, and a return line 18 for returning depressurized fluid from the steering unit to pump 12. Reservoir 10 includes a filtration means 20 that is located in return line 18 for trapping contaminants that can accumulate in the fluid system. The present invention is concerned primarily with the construction of the reservoir and associated filtration unit 20.

The illustrated reservoir includes an upright housing 22 formed by an upper housing section 24 and lower housing section 26. The two housing section have mating flanges 28 that are secured together by any conventional means, e.g. bolts, clamps, weld, etc. The two piece housing has a circular plan configuration centered on a central vertical axis 30.

Upper housing section 24 includes a filler tube 32 that is normally closed by a removable cap 34, such that replenishment fluid can be added to the system, e.g. when the fluid level in the reservoir interior space 35 falls below a desired level, designated by numeral 36 in FIG. 1. An air vent opening 37 is provided in filler tube 32, or cap 34, to maintain space 35 at a desired pressure.

The side wall 38 of upper housing section is preferably circular in the plan dimension. As shown in FIG. 1, the lower portion of wall 38 is an axial continuation of a circular side wall 39 formed by the lower housing section 26.

The lower housing section 26 has a circular side wall having a stepped construction that includes a relatively large diameter circular side wall 39 and a relatively small diameter circular side wall 42 joined to wall 39 so as to form an upwardly facing internal ledge 44.

Upper housing section 24 serves as a fluid storage device for the reserve fluid supply required to keep the system in a filled condition. Excess fluid volumes associated with thermal fluid expansion can be accommodated by interior space 35 formed by housing section 24. Under low ambient temperature conditions, fluid can be supplied from interior space 35 to the system. The fluid in space 35 is usually relatively static (non-moving).

Lower housing section 26 serves as a fluid housing for filtration means 20. The filtration means is a self-contained filtration unit that can be installed within housing section 26 as a unitary structure. The filtration unit includes an upright hollow circular frame 40 having a lower annular edge 41 and upper annular edge 43. Rectangular window-like openings 45 are formed around the peripheral surface of the frame for passage of fluid into the central space 47 defined by the frame. A filtration media 49 having a minimum porosity of about forty microns is suitably supported on the outer surface of the circular frame, whereby minute solid particles are trapped on, or near, the outer surface of the filtration media.

Fluid is supplied to the filtration unit through a tubular inlet 50 that has a tangent connection with circular side wall 39, such that the incoming fluid flows along the interior surface of circular side wall 39 in a circumferential path concentric around the central vertical axis 30. Annular space 52 surrounding the filtration unit is fluid-filled.

Filtration media 49 offers sufficient resistance to fluid flow as to generate a back pressure on the fluid flowing from power steering unit 14 into the filtration unit. The swirling fluid in annular space 52 tends to climb up along the inner surface of circular wall 39 and the aligned surface of circular wall 38. The climbing action is controlled (or limited) by an annular frusto-conical partition 53 extending outwardly from upper annular edge 43 of the filtration frame 40. Partition 53 acts as a baffle or fluid containment wall. A row of vent ports 55 is formed along the upper edge of partition 53, whereby entrained air in the circumferentially-flowing stream is vented through ports 55 upwardly into the interior space 35. Boundary layer effects at the joint between partition 53 and the side wall 38 of the upper reservoir section tend to stagnate or slow the swirling fluid to enhance the de-aeration action. Ports 55 are preferably located at, or near, the highest point in annular space 52, which tends to concentrated the air near the ports.

Ports 55 are relatively small to minimize the flow of liquid through the ports. The major percentage of liquid supplied to annular space 52 travels through filtration media 49, not the vent ports 55. However, some liquid flow through the ports is not necessarily disadvantageous, in that heated liquid flowing upwardly through the ports mixes with the relatively cool liquid in space 35, thereby reducing the average temperature in the reservoir. Liquid flow through ports 55 may help to entrain air bubbles located on the undersurface of partition 53 near the ports.

Filtration unit 20 is installed so that the lower annular edge 41 of the filtration unit seats on internal ledge 44. The upper edge of frusto-conical partition 53 fits against an overlying ledge formed on the housing side wall 38 to stabilized the filtration unit in the reservoir.

Fluid is discharged from the lower housing section 26 through a tubular outlet 57 that is tangent to circular side wall 42. Pump 12 provides the impetus for fluid flow through filtration unit 20. A suction force generated by the pump is applied through tubular outlet 57 to the fluid in central space 47 to produce a swirling motion in space 47. The tangential orientation of outlet 57 is a causative factor. The tangential orientation of tubular inlet 50 produces a circumferential swirling motion in annular space 52, such that the fluid flowing from inlet 50 to outlet 57 has an essentially continuous circumferential flow pattern around vertical axis 30.

Circumferential fluid flow through the reservoir is advantageous in that the fluid residence time is increased, so as to promote an extensive cooling action of the heated fluid introduced through inlet 50.

It will be noted that central space 47 within the filtration unit 20 is in open communication with interior space 35 defined by housing section 24. This is advantageous in that fluid in space 35 can flow downwardly into space 47 to prevent cavitation in space 47. Especially at low ambient temperatures, the fluid in annular space 52 surrounding the filtration unit may be relatively viscous so that inertia effects delay the flow from space 52 across the filtration unit 20 into central space 47.

Under such circumstances the pump suction might tend to produce cavitation in space 47. However, fluid in the upper storage space 35 can readily flow into space 47 to prevent such cavitation. Cavitation is detrimental for several reasons, including the fact that it produces an annoying audible sucking noise.

The illustrated reservoir construction achieves filtration of the fluid flowing from power steering unit 14 to pump 12 while at the same time prolonging the fluid residence time in the reservoir to promote a desired cooling action on the heated fluid. The relation between fluid storage space 35 and central space 47 prevents cavitation in space 47, especially during pump start-up.

Filtration media 49 preferably has a relatively small size porosity, in the neighborhood of forty microns. This enables the media to trap relatively small size contaminants. Also, the media is able to exert a back pressure on fluid flowing from power steering unit 14 toward tubular inlet 50. Such a back pressure tends to minimize fluid pulsation associated with operation of the pump and steering unit. Such pulsations are perceived by the vehicle occupants as a vibration or shudder in the system. The use of a forty micron filtration media tends to reduce such shudder, due to the back pressure produced by the filtration media.

The reservoir shown in FIG. 1 has a height dimension that is approximately the same as the diametrical dimension. Each dimension can be about six inch. With such proportioning the reservoir can fit into small clearance spaces that would not accommodate a taller unit, while still providing access to cap 34 and filler tube 32. The relatively large diameter filtration unit 20 can have a reasonably large filtration media surface area without unduly increasing the height of the filtration unit.

Figure 5:
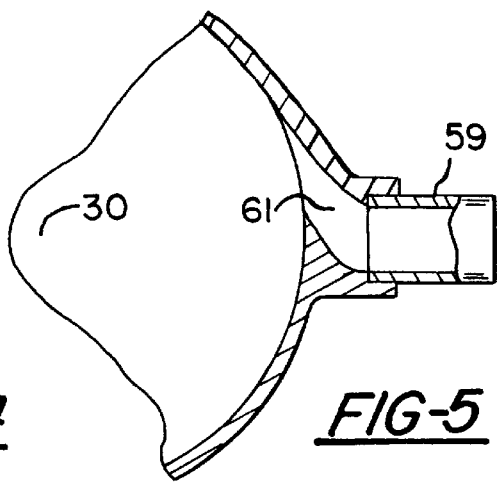
FIG. 5 is a fragmentary view showing a structural detail that can be employed in practice of the invention.

FIG. 5 of the drawings illustrates a fluid connection that can be used as an alternate for the tangential fluid connections 50 and 57. The FIG. 5 fluid connection includes a cylindrical tubular section 59 extending outwardly from the housing side wall along a radius from axis 30, and a circumferentially extending section 61 located within the housing. Hollow section 61 causes the fluid to move circumferentially as it enters (or leaves) the connector. FIG. 5 is illustrative of various mechanisms that can be used to provide a circumferential fluid flow while still having a choice in the direction taken by the connector.

Figure 3:
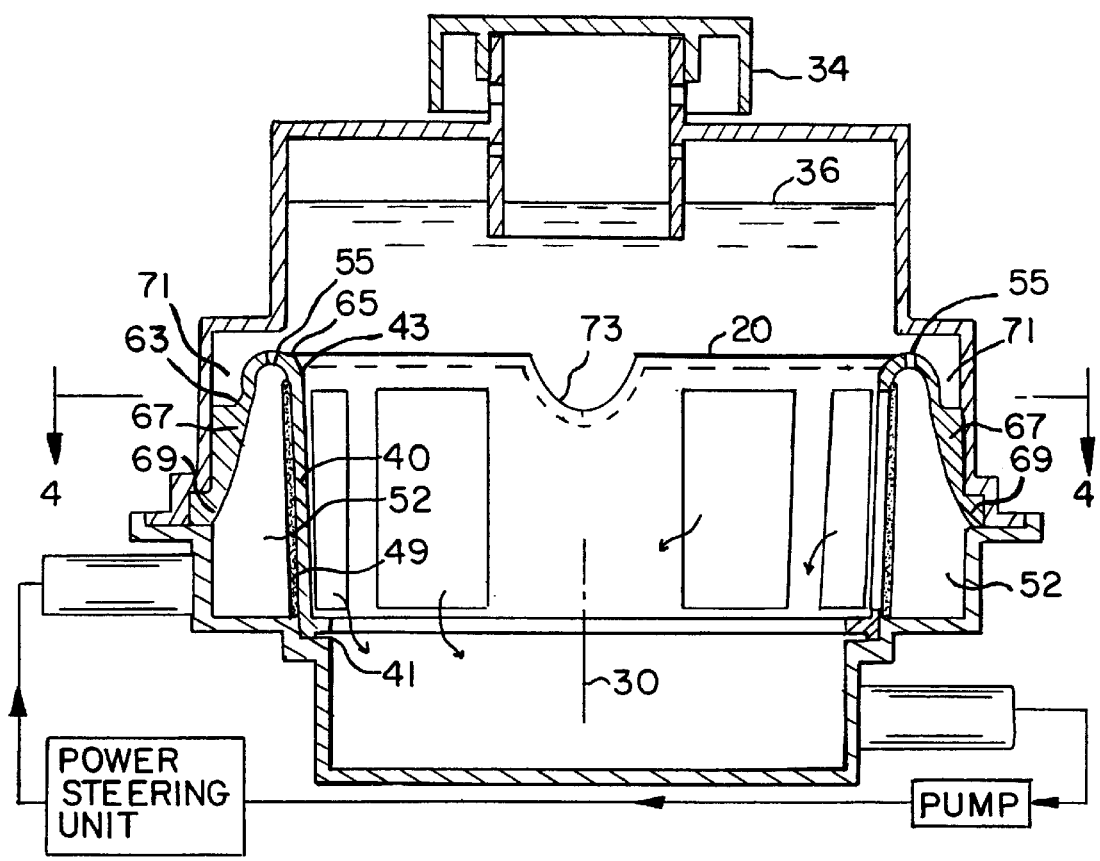
FIG. 3 is a section view taken in the same direction as FIG. 1, but illustrating another form that the invention can take.
Figure 4:
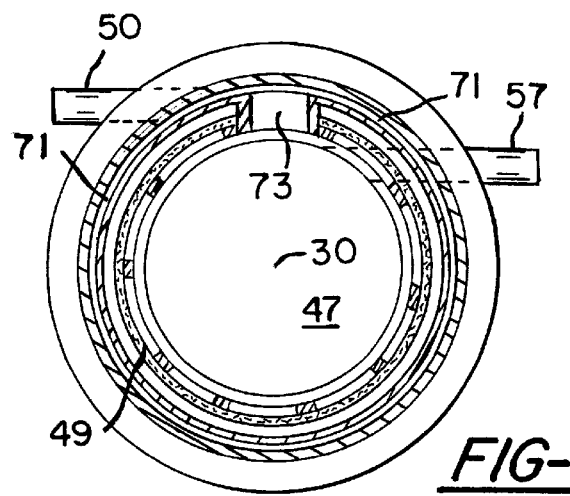
FIG. 4 is a transverse sectional view on a reduced scale, taken on line 4—4 in FIG. 3.

FIGS. 3 and 4 shows a second embodiment of the invention that is in most respects similar to the embodiment depicted in FIGS. 1 and 2. As shown in FIGS. 3 and 4, filtration unit 20 includes a circular frame 40 having a lower annular edge seated on interior ledge 41, as in the FIG. 1 arrangement. The upper annular edge 43 of frame 40 merges with an annular partition 63 that is constructed somewhat differently than the corresponding partition in the FIG. 1 embodiment.

In cross section, partition 63 includes an arcuate upper section 65 integrally connected to edge 43 of the filtration frame 40, and a main section 67 that angles downwardly away from the filtration unit to form a mounting rim 69. Vent ports 55 are formed in the arcuate upper section 65, which is the highest point on partition 63.

As shown in FIG. 3, partition 63 causes the annular space 52 to have an inverted V cross section; the upwardly convergent nature of space 52 causes any air bubbles to converge or concentrate near ports 55, thereby promoting a desired de-aeration of the swirling fluid in space 52. The filtration unit is mounted in the reservoir by means of rim 69 and the interior ledge 41.

The FIG. 3 assembly functions in essentially the same fashion as the FIG. 1 construction. However, the cross-sectional configuration of annular partition 63 is such that some fluid can accumulate in an annular space 71 surrounding the partition. To prevent long-term stagnation of fluid in space 71, the filtration unit can be provided with a V-shaped passage (or groove) 73 that communicates space 71 with central space 47 within the filtration unit. The V-shaped passage wall bridges across partition 63 and the side wall of frame 40 to allow fluid to circulate from annular space 71 into central space 47. The exterior surface of the passage 73 wall slows the circumferential swirl in space 52 near ports 55.

In major respects the FIG. 3 embodiment and the FIG. 1 embodiment operate in the same fashion. It will be appreciated that some variations in structure and arrangement can be employed while still practicing the invention.

What is claimed:

1. A reservoir for power steering fluid, comprising:

an upright housing having a vertical axis said housing comprising upper and lower housing sections having mating annular edges joined together along an interface; said upper housing section forming an upper interior space adapted to store a reserve supply of power steering fluid; said lower housing section comprising a stepped wall structure that includes a first circular side wall extending downwardly from said interface, and a second circular side wall located below said first side wall; said second side wall having a smaller diameter than said first side wall so that an annular ledge is formed at the juncture between said first and second circular side walls; a fluid inlet connection tangent to said first circular side wall for directing fluid from a power steering unit into said lower housing section; a fluid outlet connection tangent to said second circular side wall for directing fluid from the lower housing section to a pump that supplies fluid to the power steering unit; and a filtration means seated on said annular ledge for removing contaminants from the fluid flowing from said inlet connection to said outlet connection.

2. The reservoir of claim 1, wherein said filtration means comprises an upright hollow circular filtration unit having a lower annular edge seated on said annular ledge, and an upper annular edge located within said upper housing section.

3. The reservoir of claim 2, and further comprising an annular baffle means extending from the upper annular edge of said filtration unit for preventing fluid surrounding the filtration unit from swirling upwardly into said upper interior space.

4. The reservoir of claim 1 wherein said housing has a vertical height dimension and horizontal diameter dimension, said dimensions being approximately the same.

5. A reservoir for power steering fluid, comprising:

an upright housing having a vertical axis; said housing having an upper housing section defining an upper interior space adapted to store a reserve supply of fluid, and a lower housing section having fluid connections with a power steering unit and a fluid pump, whereby the pump moves fluid from the power steering unit through the lower housing section and back into the pump; and a filtration means located within said lower housing section for trapping solid contaminants; said fluid connections being configured to direct the fluid circumferentially around said vertical axis while the fluid is flowing within the lower housing section:

said lower housing section comprising a first circular side wall (39) having a relatively large diameter, and a second circular side wall (42) having a relatively small diameter;

said fluid connections comprising an inlet connection (50) tangent to said first circular side wall, and an outlet connection tangent to said second circular side wall.

6. The reservoir of claim 5, and further comprising a radial wall joining said first circular side wall to said second circular side wall, whereby said lower housing section has a stepped side wall construction:

said filtration means comprising an upright hollow circular filtration unit concentric around said vertical axis.

7. The reservoir of claim 6, and further comprising an annular partition extending outwardly from said circular filtration unit within said upper housing section for preventing flow from an annular space (52) surrounding said filtration unit into said upper interior space; and plural vent ports (55) in said annular partition for venting air from said annular space into said upper interior space.

* * * * *